United States Patent [19]

Feldman et al.

[11] 3,857,966

[45] Dec. 31, 1974

[54] PROCESS FOR BLAND, SOLUBLE PROTEIN

[75] Inventors: Jacob R. Feldman, New City, N.Y.; Gerhard J. Haas, Woodcliff Lake, N.J.; Joaquin C. Lugay, Thornwood; Claire J. Wiener, Spring Valley, both of N.Y.

[73] Assignee: General Foods Corporation, White Plains, N.Y.

[22] Filed: Aug. 16, 1973

[21] Appl. No.: 389,097

[52] U.S. Cl............... 426/7, 426/32, 426/41, 426/46, 426/49, 195/29
[51] Int. Cl.............................................. A23j 3/00
[58] Field of Search............ 426/20, 23, 32, 42, 44, 426/47, 49, 41, 52, 54, 56, 61, 63; 195/29, 111

[56] References Cited
UNITED STATES PATENTS

| | | | |
|---|---|---|---|
| 2,364,008 | 11/1944 | Stuart | 426/32 |
| 2,536,171 | 1/1951 | Hall et al. | 195/29 |
| 3,578,461 | 5/1971 | Weeks et al. | 195/29 |

Primary Examiner—A. Louis Monacell
Attorney, Agent, or Firm—Thaddius J. Carvis; Daniel J. Donovan

[57] ABSTRACT

An improved process produces protein hydrolysates in greater yields and having better taste than has heretofore been possible. According to a preferred embodiment of this process, a protein is initially heat treated at alkaline pH to condition the protein. The protein is then reacted first at alkaline pH with an alkaline microbial protease and then at neutral pH with a plant enzyme and a neutral microbial protease. The resultant hydrolysate can be winterized, clarified, flash concentrated and dried to produce a bland, clear, acid and heat stable protein supplement for foods.

23 Claims, No Drawings

PROCESS FOR BLAND, SOLUBLE PROTEIN

BACKGROUND OF THE INVENTION

This invention relates to improving the nutritional value of foods. More particularly, the present invention relates to an improved process for preparing bland, enzymatically hydrolyzed, soluble, nutritious proteinaceous material which finds wide need and application in nutritionally deficient foodstuffs.

Numerous attempts have been made to enhance the nutritive qualities of high-demand, frequently-consumed food products such as gelatin-containing desserts, hot beverages, low pH beverages and desserts, carbonated beverages, candy and other similar products. However, most prior attempts of this nature have met with only limited success. Among the reasons for this poor record of success were the adverse effect which the products have on the flavor and clarity of the foods in which they are employed as well as the poor yields and efficiencies of the processes.

Current knowledge in the science of protein chemistry does not enable the scientist to accurately predict which complex enzymatic reactions will provide superior and which will provide inferior results. Thus, while it is generally known that proteolytic enzymes hydrolyze protein, and it is known that certain enzymes function well within certain systems, the production of bland, soluble protein which will not cloud clear food substrates, especially those at low pH and those requiring heat for processing or consumption, remains an active area of investigation which until the present invention has been largely fruitless.

SUMMARY OF THE INVENTION

Accordingly, it is an object of the present invention to provide an improved process for producing a bland, enzymatically hydrolyzed, soluble, proteinaceous material.

It is a further object of the present invention to provide a process for enzymatically hydrolyzing a proteinaceous material in high yield.

It is another object of the present invention to provide a process capable of producing protein hydrolysates which can be employed in transparent food substrates without adversely affecting their clarity, consistency of texture.

It is a still further object of the present invention to provide a process capable of producing protein hydrolysates which can be successfully employed in food substrates which are to be prepared or consumed at low pH or elevated temperatures.

It is yet another object of the present invention to provide a process for preparing a bland, soluble protein hydrolysate which has high nutritional quality.

These and other objects are accomplished according to the present invention which provides an improved process for preparing a bland, enzymatically hydrolyzed, soluble, nutritious proteinaceous material which in its broad aspects comprises reacting the protein first at alkaline pH with an alkaline microbial protease, and then reacting it at near neutral pH with a plant enzyme and a neutral microbial protease. The hydrolysate is preferably winterized to remove cold-insoluble materials, clarified, flash concentrated and dried for use as a bland protein supplement in foods.

DETAILED DESCRIPTION OF THE INVENTION

The process of the present invention can be successfully employed to hydrolyze proteins from any source. Specifically, animal and vegetable proteins are contemplated. Preferred among these are whey, egg albumen, whey protein and soy protein. Soy, when and fish proteins are particularly preferred.

The proteins can be selected from those which are available from a wide variety of commercial sources or they can be prepared according to techniques well known to the art. Soy protein available commercially as Promine D soy isolate has been found suitable; as have whey protein, available as spray dried whey powder or concentrated whey (e.g., Fortein 35); egg albumin, available as fresh or dried egg white (e.g., Henningson P20 dried egg white); and fish protein (e.g., Atra-Nabisco EFP-90 eviscerated fish protein).

One method for preparing a soy isolate employs soy grits as the starting material. According to this procedure, 10% by weight aqueous slurry of soy grits is prepared and homogenized in a Waring Blendor for 3 minutes. The pH of the slurry is slowly adjusted to about 8.0 with sodium hydroxide and the slurry is stirred at ambient temperature for about 30 minutes. Next the mixture is centrifuged or filtered and the residue is discarded. The pH of the supernatant is adjusted to about 4.5 with hydrochloric acid and the acid mixture is brought to boiling and held there for approximately 6 minutes to denature the protein and destroy protease inhibitors, whereupon the mixture is cooled and centrifuged. The precipitate is then suspended in water and the pH is again adjusted to about 4.5. This mixture is centrifuged and the supernatant is discarded. The acid washing is repeated and the residue is then freeze dried for storage or resuspended to make a slurry for hydrolysis.

According to an exemplary method for preparing an egg albumin isolate, powdered or fresh egg white is employed in preparing a 5% by weight solution of egg white protein. The solution is adjusted to a pH of about 6.3–6.4 and then heated to about 85°C and maintained at this temperature for about 5 minutes to precipitate the egg protein. The mixture is cooled to room temperature and centrifuged, whereupon the supernatant is discarded thereby removing the major amounts of the egg smell and taste. The precipitate is suspended in fresh water (pH 6.3–6.5) and homogenized in a Waring Blendor, after which it is again centrifuged and the supernatant discarded. The washing step is repeated once more, and the washed precipitate is either freeze dried for storage or suspended in water to make a 5% protein suspension for hydrolysis.

A method for preparing a whey isolate includes employing fresh milk whey or dried whey powder to prepare a 5% to 10% slurry of whey protein. The slurry is adjusted to a pH of about 5.1 and then treated to boiling to precipitate the proteins. The mixture is cooled and centrifuged, whereupon the supernatant is discarded. The precipitate is resuspended in water a pH of about 5.1, after which it is again centrifuged and the supernatant discarded. This washing step is repeated once more, and at this stage the lactose content, salts and milky taste are substantially reduced. The precipitate can then be freeze dried for storage or resuspended to make a slurry for hydrolysis.

According to the present invention, the protein is preferably washed either batchwise or continuously, if necessary to remove any undesirable flavors. It is generally desirable to heat the protein at its isoelectric pH to insure maximum protein recovery. The insoluble material, which is mostly protein, is recovered by any suitable means, centrifuging having been found satisfactorily effective. After the protein has been adequately washed, it is suspended in water. While the percentage of solids is not critical to the present invention, protein concentrations of from about 5 to 15 percent are considered effective. Higher concentrations are not preferred because of the resulting increase in viscosity which causes difficulties in mixing and handling. Lower concentrations are not preferred because this would increase the size of equipment required and require removal of greater amounts of moisture. Protein concentrations of from about 8% to 12% are preferred.

The protein suspension is then heated at alkaline pH at a temperature and for a period of time effective to condition the protein for efficient enzymatic hydrolysis; in the case of soy protein isolate, also to destroy whatever residual trypsin inhibitors are left from the prior treatments. Preferably, this is accomplished by establishing the pH of the suspension at a weakly alkaline value and heating. Typically, the pH is adjusted by the addition of a suitable base such as sodium hydroxide to within the range of from about 8 to 9, preferably 8.5 to 8.75. And, the temperature is raised to boiling or close to boiling, typically, 95° to 100°C.

The enzymatic hydrolysis reaction is typically conducted at temperatures lower than those employed during the initial heating. Accordingly, it is usually necessary to cool the suspension to the desired hydrolysis temperature. Typically, to from about 25° to 65°C. Preferably, the temperature is reduced to and maintained at about 50°C for the hydrolysis reaction.

The first stage of the hydrolysis reaction according to the present invention is carried out at a mildly alkaline pH with an alkaline microbial protease (i.e., a microbial protease having an optimum pH within the alkaline range). Typically, this first stage reaction should be initiated at a pH within the range of from about 8.0 to 8.5, with pH 8.2 being preferred. In those instances wherein the previous heat treatment has reduced the pH to below these levels, it must be adjusted by addition of a suitable base such as sodium hydroxide.

Preferred among the alkaline microbial proteases are the alkaline bacterial protease, especially those from genus Bacillus, and most preferred are those from *B. Subtilis*. Typically, this enzyme is employed at a level of from about 15,000 to 225,000 protease units per 100 grams of protein. A preferred procedure is to employ the alkaline protease having about 150,000 protease units per gram at a level of about 1 percent by weight, based on the weight of the protein. A protease unit, in this instance, is defined as that amount which acts on milk casein for 1 minute at 30°C and produces a quantity of Folin color producing substances, not precipitated by trichloroacetic acid, that is equivalent to 1 microgram of tyrosine. The microbial alkaline protease is available commercially as Bioprase, Alcalase, Maxatase, etc., or it can be prepared using standard, sanitary and acceptable procedures as described in Enzymes in Food Processing, Reed et al., p. 209 (1966).

Constant, efficient stirring of the suspension is maintained throughout the period of reaction. Likewise the temperature is maintained at the desired level. However, the reaction will cause the pH of the suspension to drop and this is not adjusted.

The first stage of the reaction is allowed to progress until the pH drops to about 6.5 to 7.5, preferably 7.0. At this point, the neutral microbial protease and the plant enzyme are added for the second stage of the reaction which progresses at near neutral pH. Typically, this stage of the reaction will be initiated at a pH within the range of from about 6.5 to 7.5, preferably 7.0.

The neutral microbial protease is characterized as an enzyme prepared by fermentation from a non-pathogenic microbial strain and exhibits its optimum proteolytic activity at near neutral pH. Typically, this enzyme is employed at a level of from about 0.075 to 1.2 Anson units per 100 grams of protein. A preferred procedure is to employ the neutral microbial protease having about 1.5 Anson units per gram at a level of about 0.5% by weight, based on the weight of the protein. An Anson unit is defined as that amount of enzyme which under standard conditions will digest hemoglobin at an initial rate such that there is liberated per minute an amount of split products not precipitated by trichloroacetic acid which gives the same color with phenol reagent as 1 microequivalent of tyrosine. Bacterial neutral protease is preferred, with those from genus Bacillus being more preferred, and among these, those from *B. Subtilus* being most preferred. It can be selected from those available commercially, such as Bacterial Protease Novo (BPN), or it can be prepared according to standard procedures.

The plant enzyme is characterized as an enzyme obtained from a plant source, such as bromelin, ficin and papain. Preferred among these is papain which is derived from the latex of the fruit of the plant, Carica Papaya. Typically, this enzyme, having about 29,700 protease units per mg, is employed at a level of from about 0.05 to about 0.7 percent, preferably about 0.5 percent by weight, based on the weight of the protein. A protease unit in this instance is defined as the amount of enzyme which releases one microgram of tyrosine from a specified casein substrate according to the assay method in Food Chemicals Codex (1972).

According to the preferred mode of the invention, the reaction is continued for about 100 to 110, preferably 105 minutes, at 50°C. Those skilled in the art will be aware of the relationship between time and temperature outside the preferred ranges. Upon completion of the reaction, the enzymes are inactivated. Preferably, this is accomplished by raising the temperature to a level and for a time effective to cause inactivation. Temperatures of from about 85°C to 90°C and times of from about 2 to 5 minutes are generally effective, with the lower temperatures requiring the longer times.

At this point, the soluble hydrolysate is separated from the insoluble material remaining in the suspension. This can be accomplished by any suitable technique such as filtration or centrifugation, with centrifugation being preferred. Preferably, the insoluble portion is washed to separate therefrom any further soluble hydrolysate, and the wash water is added to the solution of soluble hydrolysate.

Depending upon its intended use, the soluble hydrolysate can at this point be dried for subsequent use or winterized then dried to assure clarity when employed in chilled, transparent food substrates such as gelatin desserts. Winterizing and clarifying is typically effected by adjusting the pH of the hydrolysate with a suitable acid such as HCl or $H_3PO_4$ to that of the material in which it will be employed, adding Celite diatomaceous earth, chilling for a time of from about 6–24 hours at about 0°C and then separating the insolubles such as by filtration. The hydrolysate is then flash concentrated and dried to assure clarity.

Any suitable means for drying the hydrolysate can be employed. Freeze drying and spray drying have been found to be effective.

After drying, the hydrolysate can be employed in a wide variety of food substrates to increase the nutritional value thereof. For example, the hydrolysates can be added to gelatin desserts at about a 3 percent level; to honey, jellies and jams at about 10 to 20 percent with no adverse effects on the organoleptic characteristics of these foods. These hydrolysates have also been found compatible with orange and strawberry flavored dry beverage mixes at about the 3 percent level. Additionally, soy and whey hydrolysates, adjusted to pH 5.1, have been found compatible with coffee at a level of 2.1 g per 5½ oz. cup. Its use is of course not limited to these specific products but can be employed in most any food product with beneficial results.

The following examples are presented for the purpose of further illustrating and explaining the present invention and are not to be taken as limiting in any sense. Unless otherwise specified, all parts and percentages are by weight.

EXAMPLE I

To prepare a soy protein hydrolysate according to the present invention, a 10 percent suspension of Promine D soy isolate was adjusted to pH 8.75, heated to 95°–100°C with a steam coil, and maintained at that temperature for 15 minutes. The material was then cooled and held at 50°C. Bioprase (Nagase) alkaline microbial protease (150,000 protease units per gram) was added at a level which was 1.0 percent of the dry Promine D soy isolate. When the pH reached 7.0, 0.5 pecent neutral bacterial protease Novo (1.5 Anson units/gram) and 0.5 percent papain (Miles —27,900 protease units per mg) were added. Hydrolysis was terminated after a total of 105 minutes by heating to above 85°C with a steam coil. The material was centrifuged and the supernatant liquid was adjusted to pH 3.95 with phosphoric acid. Celite diatomaceous earth was added at a level of 60 grams per liter, and the hydrolysate was chilled overnight. It was then filtered using 20 grams per liter of Celite diatomaceous earth as a filter precoat. The filtrate was flash concentrated and then freeze dried.

EXAMPLE II

To prepare an egg albumin hydrolysate, the whites of several dozen eggs were separated and then diluted 1:1 with water. The pH was adjusted to 6.35 and the material was heated to 85°C for fifteen minutes, then cooled and centrifuged. The precipitate was resuspended, pH adjusted, and centrifuged twice again.

The solids were resuspended, adjusted to pH 8.75, heated for 15 min., and hydrolyzed in the same manner described for soy in Example I except 0.5 percent Bioprase was used instead of 1 percent.

EXAMPLE III

To prepare a fish protein hydrolysate, a 10 percent suspension of a fish protein concentrate was adjusted to pH 8.75, heated for 15 min. and treated as described in Example II for egg albumin.

EXAMPLE IV

A whey protein hydrolysate is prepared according to the procedure employed in Example I for soy protein, except that a 6 percent suspension of washed Fortein 35 whey was employed in place of the soy protein, and the Bioprase concentration was 0.1 instead of 1.0 percent.

EXAMPLE V

A soy protein hydrolysate is prepared according to the procedure employed in Example I, except that Bioprase was employed at 0.1% and the hydrolysate was subjected to another Celite diatomaceous earth clarification after initial drying, then freeze dried.

EXAMPLE VI

Each of the four hydrolysates of Examples II through V were evaluated in commercially available strawberry flavored Jell-O brand gelatin dessert. Four individual servings, each containing:

21.25 g of strawberry flavored Jell-O brand gelatin dessert mix
3.0 g of protein hydrolysates of Example II–V, and
116 ml of water were prepared as follows:

58 ml. of boiling distilled water was added to the combined gelatin dessert and hydrolyzed protein for each sample. After dissolution by stirring, 58 ml of cold distilled water was stirred into each sample. A control sample was prepared in the same manner, but omitting any hydrolysate. The samples were placed in a refrigerator for about 4 hours and then evaluated for taste and clarity. All samples were equally clear and had good taste. The sample prepared with the whey protein hydrolysate completely masked the natural "wet dog" taste found in the control.

Many modifications and variations of the present invention will be apparent to those skilled in the art upon reading the above disclosure. It is intended that all such modifications and variations be included within the scope of the invention which is defined by the following claims.

What is claimed is:

1. An improved process for preparing a bland, soluble, nutritious, enzymatically hydrolyzed proteinaceous material comprising:
   a. first reacting a protein at alkaline pH with an alkaline microbial protease;
   b. then reacting the protein at neutral pH with a plant enzyme and a neutral microbial protease.

2. An improved process according to claim 1 wherein the alkaline microbial protease is one derived from *B. Subtilis*.

3. An improved process according to claim 1 wherein the plant enzyme is papain.

4. An improved process according to claim 1 wherein the neutral microbial protease is one derived from *B. Subtilis*.

5. An improved process according to claim 1 wherein the alkaline microbial protease is one derived from *B. Subtilis, the plant enzyme is papain, and the neutral microbial protease is one derived from B. Subtilis.*

6. An improved process for preparing a bland, soluble, nutritious, enzymatically hydrolyzed proteinaceous material comprising:
   a. suspending a protein in water;
   b. establishing the pH of the resulting suspension at within the alkaline range and adusting the temperature of the suspension to within the range of from about 25° to 65°C;
   c. adding alkaline microbial protease and continuing the reaction until the pH drops to within the range of about 6.5 to 7.5; and
   d. adding to the suspension a plant enzyme and neutral microbial protease and continuing the reaction for a period of time effective to produce a bland, soluble hydrolysate.

7. An improved process according to claim 6 wherein the alkaline microbial protease is one derived from *B. Subtilis*.

8. An improved process according to claim 6 wherein the plant enzyme is papain.

9. An improved process according to claim 6 wherein the neutral microbial protease is one derived from *B. Subtilis*.

10. An improved process according to claim 6 wherein the alkaline microbial protease is one derived from *B. Subtilis*, the plant enzyme is papain, and the neutral microbial protease is one derived from *B. Subtilis*.

11. An improved process according to claim 6 including the further step of heating the suspension of protein in water, before addition of the enzymes, at an alkaline pH at a temperature and for a time effective to condition the protein for hydrolysis.

12. An improved process according to claim 6 which further includes the step of heating the suspension, after hydrolysis, to a temperature and for a time sufficient to inactivate the enzymes.

13. An improved method according to claim 6 which further includes the step of separating the resulting hydrolysate solution from the insoluble material remaining in the suspension.

14. An improved process according to claim 13 which further includes:
   a. ajusting the pH of the hydrolysate solution to about 4.0;
   b. chilling the solution to a temperature of about 0°C for from about 6 to 24 hours; and
   c. separating the insoluble portion from the soluble portion.

15. An improved process according to claim 14 which further includes:
   a. adding about 60 g of diatomaceous earth for each liter of the hydrolysate solution before cooling; and
   b. filtering the solution through a filter coated with about 20 g of diatomaceous earth per liter of hydrolysate solution.

16. An improved process according to claim 6 which further includes flash concentrating and drying the hydrolysate solution to obtain a dry hydrolysate.

17. An improved process according to claim 6 wherein the protein comprises soy protein.

18. An improved process according to claim 6 wherein the protein comprises egg albumin protein.

19. An improved process according to claim 6 wherein the protein comprises fish protein.

20. An improved process according to claim 6 wherein the protein comprises whey protein.

21. An improved process according to claim 6 wherein the reaction temperature is maintained at about 50°C.

22. An improved process according to claim 6 wherein the reaction temperature is maintained at about 50°C and the reaction is continued for about 100 to about 110 minutes after addition of the first enzyme.

23. An improved process according to claim 6 wherein the pH of the suspension of step (b) is adjusted to within the range of from about 8.0 to about 8.5.

* * * * *